Dec. 15, 1953　　　L. M. MOWE ET AL　　　2,662,313
DIRT LEVELER ATTACHMENT FOR DUMP TRUCKS
Filed Sept. 23, 1948　　　2 Sheets-Sheet 1
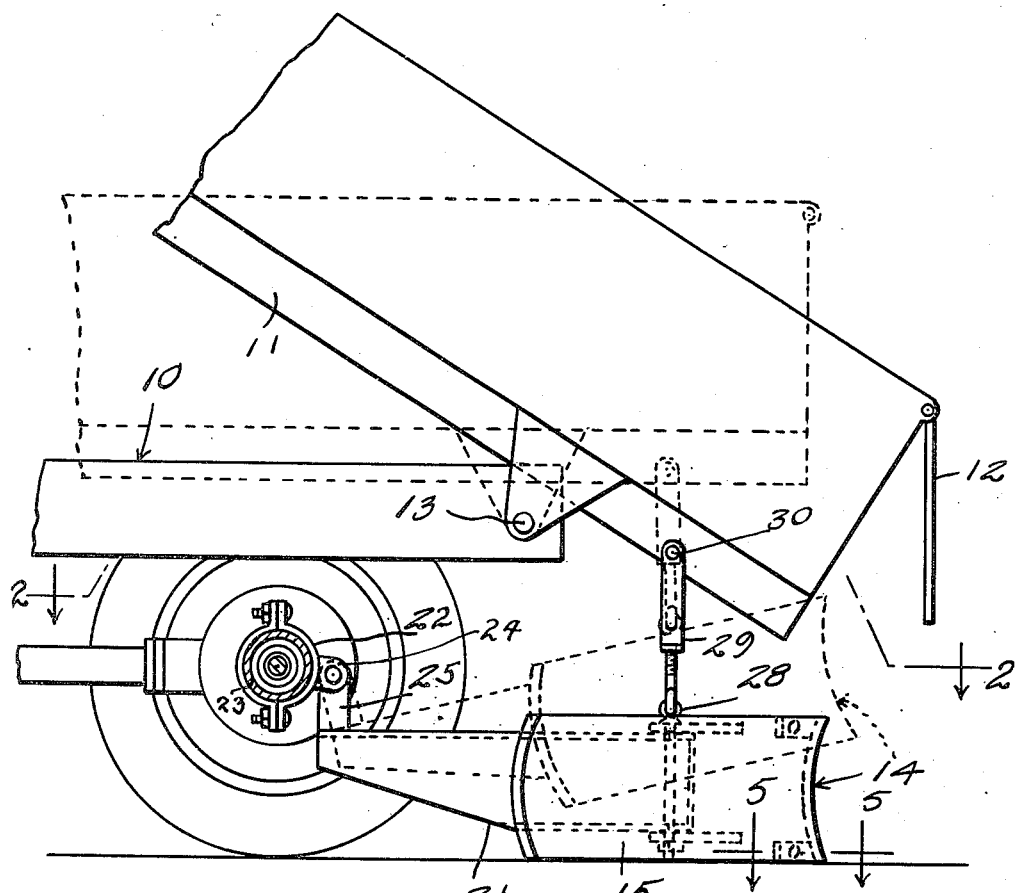
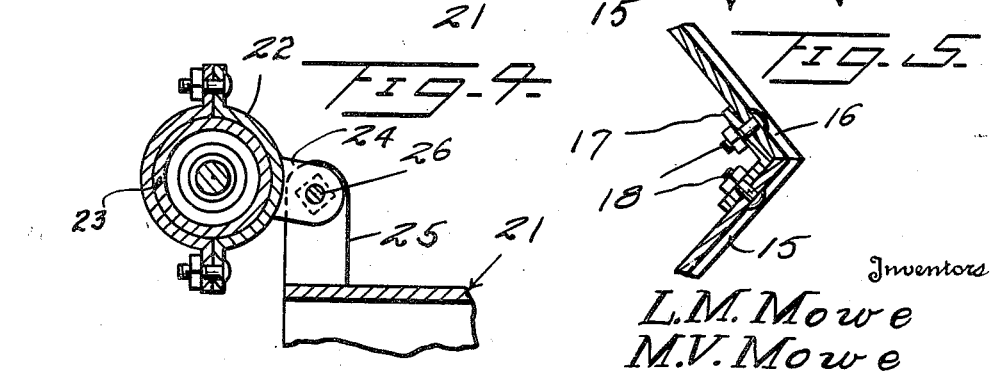
Inventors
L. M. Mowe
M. V. Mowe
M. L. Mowe
By Kimmel & Crowell Attys.

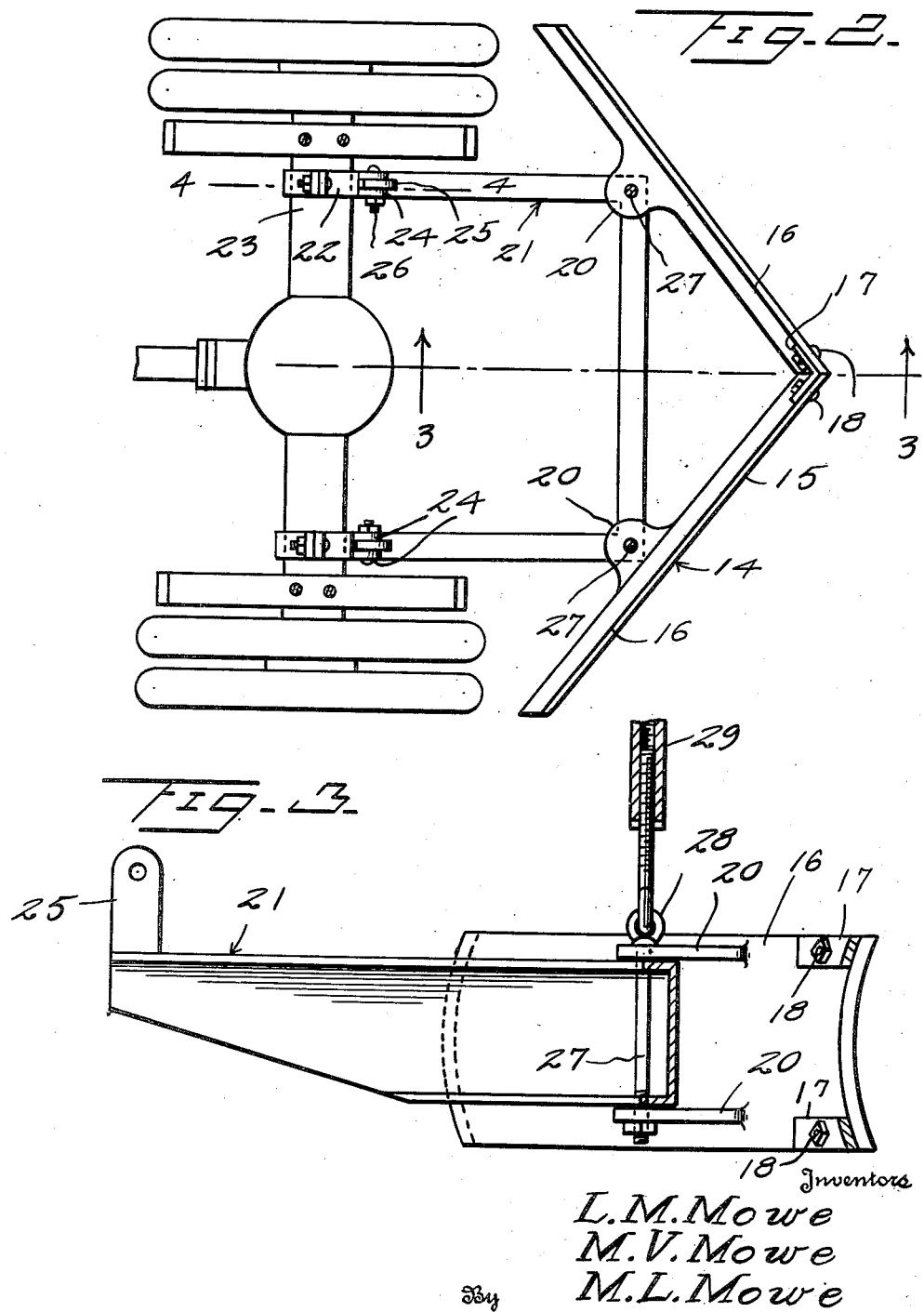

Patented Dec. 15, 1953

2,662,313

UNITED STATES PATENT OFFICE 2,662,313

DIRT LEVELER ATTACHMENT FOR DUMP TRUCKS

Lester M. Mowe, Mildred V. Mowe, and Melvin L. Mowe, Astoria, Oreg.

Application September 23, 1948, Serial No. 50,844

1 Claim. (Cl. 37—172)

This invention relates to a scraping or leveling attachment for trucks of the tiltable body type.

An object of this invention is to provide an attachment for a truck having a dump body whereby the dirt or other material dumped from the rear of the truck body may be levelled or pushed by backing the truck.

Another object of this invention is to provide an attachment of this kind which is raised to inoperative position when the truck body is horizontal, but may be lowered to operative position when the truck body is raised to dumping position.

A further object of this invention is to provide in combination with the dump body of a truck, a plow or blade which is pivotally carried by the chassis of the truck and connected to the rear portion of the body, so that rocking of the body to dumping position will lower the plow or blade to operative position for moving dirt, snow or the like when the truck is backed.

To the foregoing objects, and others which may hereinafter more fully appear, the invention consists of the novel construction, combination and arrangement of parts, as will be more specifically referred to and illustrated in the accompanying drawings, but it is to be understood that changes, variations and modifications may be resorted to which fall within the scope of the invention as claimed.

In the drawings,

Figure 1 is a fragmentary side elevation of a dumping truck having an earth or snow moving blade mounted thereon constructed according to an embodiment of this invention, Figure 2 is a fragmentary sectional view taken on the line 2—2 of Figure 1, Figure 3 is a sectional view taken on the line 3—3 of Figure 2, Figure 4 is a fragmentary sectional view taken substantially on the line 4—4 of Figure 2, Figure 5 is a fragmentary sectional view taken on the line 5—5 of Figure 1.

Referring to the drawings, the numeral 10 designates generally the chassis of a truck having a dump body 11 which is pivotally mounted as at 13 adjacent the rear of the chassis 10. The body 11 is adapted to be raised at its forward end by any suitable conventional means (not shown) so that the material placed within the body 11 will flow downwardly and outwardly through the rear or dumping end of the body which is closed when the body is in horizontal position by means of an end gate 12.

In order to provide a means whereby the material such as dirt, snow or other material which is discharged from the body 11 at the end gate 12 may be pushed rearwardly for leveling the discharged material or moving this material, we have provided a blade member generally designated as 14. The blade member 14 as shown in Figure 2 comprises a pair of rearwardly convergent blade members 15 and 16 which are detachably coupled together at their rear convergent ends by means of a pair of angled coupling members 17 secured to the blades 15 and 16 by removable fastening means 18.

The blade 15 has secured to the forward side thereof a pair of spaced ears 20 and the blade 16 has secured to the forward side thereof a pair of spaced ears 20. The blade member 14 is swingably supported in an underslung position relative to the body at the rear of the truck by means of a U-shaped frame 21 which extends rearwardly of the truck to position the blade just forwardly of the end gate 12 and is pivotally supported at its forward end from a pair of split bands 22 which are clamped about the rear axle housing 23 of the truck. Each band 22 has extending rearwardly therefrom a pair of ears 24 and the frame 21 at its forward end has extending upwardly therefrom an ear 25 engaging between the ears 24 and pivotally secured therebetween by fastening means 26.

The rear end of the frame 21 extends between the pairs of ears 20 and bolts 27 are extended through the rear portion of the frame 21 and through the ears 20. Each bolt 27 is formed with an eye 28 at its upper end through which an extensible link 29 is engaged. The link 29 is pivotally secured at its upper end as at 30 to the lower rear portion of the truck body 11 so that rocking of the truck body 11 about the pivot 13 will raise or lower the blade structure 14.

By providing the adjustable links 29 the blade member 14 may be adjusted so that it will be in the desired operative position when the truck body is raised at its forward end to a dumping position and the blade structure 14 will be elevated to an inoperative position when the truck body has been lowered to a horizontal position. When the material is being discharged from the body 11 by raising the body as shown in full lines in Figure 1, the plow blade member 14 will be lowered to an operative position. After the material has been discharged or during the discharge of the material, the truck may be backed up so that the discharged material will be leveled or moved by engagement of the plow blade member 14 with the material.

Through the use of an attachment as hereinbefore described, a conventional dumping truck structure may be converted into a scraper, leveler, or earth moving means thereby eliminating the necessity of a contractor using a separate bulldozer or earth moving means for moving the earth after the earth has been discharged from a truck body. The plow blade member is herein disclosed as being of V-shape but it will be understood that if desired, this blade member may be of other shape and the blade may be used for plowing snow or material other than dirt.

What we claim is:

A material moving attachment for a truck having a mobile chassis and a rockable dump body having a dumping end, comprising a U-shaped frame, means pivotally securing the forward ends of said frame to the rear axle housing of said chassis for pivoting in a vertical plane said means including a pair of clamps secured to opposite ends of said axle housing, ears extending from said clamps, upright ears extending from the rear end of said frame and pivotally connecting said first ears and said upright ears, a pair of angularly converging plow blades carried by the rear end of said frame and disposed in underslung relation to said dumping end, means releasably securing said blades to the rear of said frame said means including spaced appertured ears extending horizontally from the inner side of each blade, said frame having apertures therein aligned with the apertures in said ears and bolts extending through said aligned apertures, said bolts having eyes at their upper ends, a pair of rigid adjustable links pivotally connected to said body connecting the eyes of said bolts to the body rearwardly of the pivotal connection of the body with the chassis, whereby raising of said body to dumping position will lower said blades to operative position, and rocking of said body to horizontal position will dispose said blade in raised inoperative position, said links being adjustable to a length greater than the vertical spacing between said body and said blade when said body is in dumping position to permit said blade to cut below the floor level, and means detachably securing the converging ends of said blades together.

LESTER M. MOWE.
MILDRED V. MOWE.
MELVIN L. MOWE.

References Cited in the file of this patent

UNITED STATES PATENTS

| Number | Name | Date |
|---|---|---|
| 1,711,488 | Bising | May 7, 1929 |
| 1,759,697 | Hill | May 20, 1930 |
| 1,760,455 | Van Valkenburg | May 27, 1930 |
| 2,152,092 | Rougier | Mar. 28, 1939 |
| 2,163,682 | Heeren | June 27, 1939 |
| 2,233,237 | Andersen et al. | Feb. 25, 1941 |
| 2,333,361 | Churchill | Nov. 2, 1943 |
| 2,421,211 | Lutz | May 27, 1947 |
| 2,445,472 | Butch | July 20, 1948 |
| 2,474,065 | Porter | June 21, 1949 |
| 2,484,325 | Wachter | Oct. 11, 1949 |